United States Patent Office 3,562,307
Patented Feb. 9, 1971

3,562,307
COBALT ADDITION COMPOUNDS AND PROCESS FOR PRODUCING THE SAME
Giacomo Costa, Via Virgilio 17/1, and Giovanni Mestroni, Strada di Guardiella 10/1, both of Trieste, Italy
No Drawing. Filed Feb. 16, 1968, Ser. No. 705,891
Claims priority, application Italy, Feb. 17, 1967, 12,762/67
Int. Cl. C07j *15/06*
U.S. Cl. 260—439                                     7 Claims

ABSTRACT OF THE DISCLOSURE

Organometallic tetradentate-complexes of cobalt having the formula

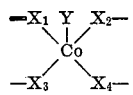

wherein $X_1$, $X_2$, $X_3$ and $X_4$, which may be the same or different and which form part of the same or different chelating agent, each represents a nitrogen, oxygen, sulphur or phosphorus atom, with the proviso that $X_1$, $X_2$, $X_3$ and $X_4$ cannot simultaneously represent four nitrogen atoms, and Y is either:

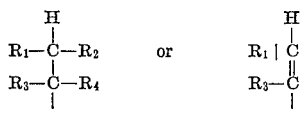

wherein $R_1$, $R_2$, $R_3$ and $R_4$, which may be the same or different, each represents a substituted or unsubstituted, saturated or unsaturated hydrocarbon radical having from 1 to 8 carbon atoms, a halogen or hydrogen atom, or a hydroxyl, ester or cyanide group are disclosed as well as a novel process for preparing same. These complexes are useful as catalysts in organic reactions such as oxidations, oxoreactions and nitrosations.

---

This invention relates to an organometallic product of cobalt complexed complexed with a polydentate chelating agent and to a process for producing the same.

According to one aspect of the present invention, there is provided an organometallic product of cobalt complexed with a polydentate chelating agent, having in the molecule a group represented by the following general formula:

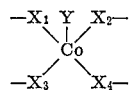

wherein $X_1$, $X_2$, $X_3$ and $X_4$, which may be the same or different and which form part of the same or different chelating agent, each represent a nitrogen, oxygen, sulphur or phosphorous atom, with the proviso that $X_1$, $X_2$, $X_3$ and $X_4$ cannot simultaneously represent four nitrogen atoms, and Y represents one of the two following general formulae:

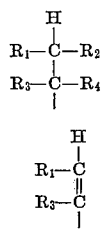

wherein $R_1$, $R_2$, $R_3$ and $R_4$, which may be the same or different, each represent a substituted or unsubstituted, saturated or unsaturated hydrocarbon radical having from 1 to 8 carbon atoms, a halogen or hydrogen atom, or a hydroxyl, ester or cyanide group, the cobalt atom optionally being bonded to, as a sixth group, a Lewis base.

According to another aspect of the present invention, there is provided a process for producing the compounds of the invention, which comprises reacting a compound having the following general formula:

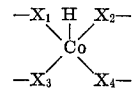

wherein $X_1$, $X_2$, $X_3$ and $X_4$ are as hereinbefore defined with an unsaturated compound having one of the two following formulae:

wherein $R_1$, $R_2$, $R_3$ and $R_4$ are as defined above.

An example of a suitable polydentate agent is Salen.

Such a reaction may be carried out in the presence of a Lewis base, for example an ether, water, amine or a phosphine; in this case the complex is formed with a molecule of the Lewis base to produce the following compound:

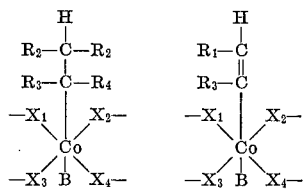

wherein B is the Lewis base.

In the compounds of the invention, the cobalt is in the bivalent or trivalent state.

The compounds which may be added to these polydentate chelated complex hydrides include olefinic or acetylenic compounds as hydrocarbons, olefinic and acetylenic alcohols, olefinic and acetylenic nitriles, olefinic and acetylenic esters, as well as all the compounds having various unsaturations.

The reaction may be effected in an inert solvent and the unsaturated compound may be introduced at a pressure of more than one atmosphere.

The compounds according to the present invention may be employed as catalysts in the organic reactions e.g. oxidation, oxoreaction, nitrosation.

The invention will now be illustrated by the following examples.

EXAMPLE 1

0.1 mole of Co (II) Salen (di-salycil-aldehyde-ethylenedi-iminate) was dissolved in anhydrous tetrahydrofuran, reduced with excess sodium amalgam, treated with water to produce a green-colored solution which when treated with acetylene gave rise to an orange-yellow coloured solution which was concentrated under vacuum. When this concentrated solution was treated with water, a crystalline solid was produced. This product was purified by crystallization using a methanol-water mixture (yield 85%). The analysis of the product was as follows:
    *Analysis.*—Calc. (percent): C. 58.39; H, 5.17; N, 7.56.
Observed (percent): C, 58.15; H, 5.21; N, 7.49.

EXAMPLE 2

The process of Example 1 was repeated, except that acrylonitrile was used instead of acetylene. The analysis of the purified product was as follows:
    *Analysis.*—Calc. (percent): C, 57.44; H, 5.07; N, 10.58.
Observed (percent): C, 57.61; H, 4.99; N, 10.31.

What we claim is:

1. An organometallic tetradentate complex of cobalt having the formula

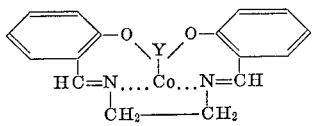

wherein Y is selected from the group consisting of —$CH_2$—CH—CN and —CH=$CH_2$.

2. An organometallic product as claimed in claim 1 wherein it is bonded to water.

3. The product according to claim 1 wherein Y is —$CH_2$—CH—CN.

4. The product according to claim 1 wherein Y is —CH=$CH_2$.

5. Process for the production of an organometallic tetradentate complex of cobalt having the formula defined in claim 1 which comprises reacting a compound having the formula:

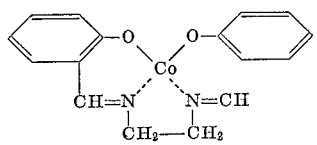

in the presence of a solvent containing an excess amount of sodium amalgam with an unsaturated compound selected from the group consisting of acetylene and acrylonitrile.

6. The process according to claim 5 wherein said unsaturated compound is acetylene.

7. The process according to claim 5 wherein said unsaturated compound is acrylonitrile.

References Cited

UNITED STATES PATENTS 2,450,276    9/1948    Fogler et al. _____ 23—221
2,508,490    5/1950    Calvin et al. _____ 260—439

Costa et al., J. Organometal. Chem. 11 (1968), pp. 333–40.

Chaberek et al., Organic Sequestering Agents, John Wiley and Sons, Inc., New York, N.Y., 1959, pp. 6–8.

TOBIAS E. LEVOW, Primary Examiner

A. P. DEMERS, Assistant Examiner

U.S. Cl. X.R.

252—431

PO-1050
(5/69)

UNITED STATES PATENT OFFICE
CERTIFICATE OF CORRECTION

Patent No. 3,562,307      Dated February 9, 1971

Inventor(s) Giacomo Costa et al.

It is certified that error appears in the above-identified patent and that said Letters Patent are hereby corrected as shown below:

Column 1, after the names of the inventors, insert --, ass:

to Snam Progetti, S.p.A., Milan, Italy--

Signed and sealed this 3rd day of April 1973.

(SEAL)
Attest:

EDWARD M. FLETCHER, JR.      ROBERT GOTTSCHALK
Attesting Officer      Commissioner of Pat